US012809918B2

(12) United States Patent
Kim et al.

(10) Patent No.: US 12,809,918 B2
(45) Date of Patent: Nov. 24, 2026

(54) ELECTRONIC APPARATUS FOR CLUSTERING GRAPH DATA ON BASIS OF GNN AND CONTROL METHOD THEREFOR

(71) Applicant: SAMSUNG ELECTRONICS CO., LTD., Suwon-si (KR)

(72) Inventors: Soohyung Kim, Suwon-si (KR); Sejeong Kwon, Suwon-si (KR); Yul Kim, Suwon-si (KR); Jungho Park, Suwon-si (KR); Wonsuk Yang, Suwon-si (KR); Kyunghwan Lee, Suwon-si (KR); Junhyuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/024,992

(22) Filed: Jan. 16, 2025

(65) Prior Publication Data

US 2025/0156480 A1 May 15, 2025

Related U.S. Application Data

(63) Continuation of application No. PCT/KR2023/008460, filed on Jun. 19, 2023.

(30) Foreign Application Priority Data

Aug. 12, 2022 (KR) ........................ 10-2022-0101038
Oct. 11, 2022 (KR) ........................ 10-2022-0130052

(51) Int. Cl.
*G06F 16/901* (2019.01)
*G06F 11/34* (2006.01)
(Continued)

(52) U.S. Cl.
CPC ...... *G06F 16/9024* (2019.01); *G06F 11/3476* (2013.01); *G06F 18/2155* (2023.01); *G06F 18/2321* (2023.01)

(58) Field of Classification Search
None
See application file for complete search history.

(56) References Cited

U.S. PATENT DOCUMENTS 10,936,669 B2 3/2021 Li et al.
11,531,866 B2 12/2022 Yoon et al.
(Continued)

FOREIGN PATENT DOCUMENTS

CN 112365344 A 2/2021
CN 113341712 A 9/2021
(Continued)

OTHER PUBLICATIONS

Bianchi, Filippo Maria. "Simplifying clustering with graph neural networks." arXiv preprint arXiv:2207.08779 (Jul. 18, 2022). (Year: 2022).*

(Continued)

*Primary Examiner* — Umar Mian
(74) *Attorney, Agent, or Firm* — Sughrue Mion, PLLC

(57) ABSTRACT

A control method for an electronic apparatus includes, obtaining, based on log data of devices, a first graph including first information regarding devices and second information regarding relevance among the devices; obtaining an edge-based second graph based on the first graph such that edges of the second graph include edges of the first graph, and the second edges include third information regarding clustering rules from the edges of the first graph; converting the second graph into a node-based third graph such that nodes of the third graph include the third information; converting the third information into probability labels of (Continued)

the nodes, wherein a probability label indicates relevance between two devices from among the devices; converting the third graph into an edge-based fourth graph such that edges of the fourth graph include the probability labels; and clustering the devices into groups based on the first graph and the fourth graph.

15 Claims, 16 Drawing Sheets

(51) Int. Cl.
*G06F 18/214* (2023.01)
*G06F 18/2321* (2023.01)

(56) References Cited

U.S. PATENT DOCUMENTS

| | | | |
|---|---|---|---|
| 11,916,853 | B2 | 2/2024 | Chen |
| 2020/0320126 | A1 | 10/2020 | Atlas et al. |
| 2021/0303598 | A1 | 9/2021 | Mermoud et al. |
| 2022/0138502 | A1 | 5/2022 | Li et al. |
| 2022/0197949 | A1 | 6/2022 | Kim et al. |
| 2022/0230073 | A1 | 7/2022 | Tago et al. |

FOREIGN PATENT DOCUMENTS

| | | | |
|---|---|---|---|
| JP | 6917972 | B2 | 8/2021 |
| JP | 2022-111841 | A | 8/2022 |
| KR | 10-2021-0032105 | A | 3/2021 |
| KR | 10-2256199 | B1 | 5/2021 |
| WO | 2022/143505 | A1 | 7/2022 |

OTHER PUBLICATIONS

Li, Jiachen, et al. "CCST: Cell clustering for spatial transcriptomics data with graph neural network." Published Dec. 8, 2021 by ResearchGate. Accessed Nov. 28, 2025 from https://doi.org/10.21203/rs.3.rs-990495/v1 (Year: 2021).*

Bianchi, Filippo Maria, Daniele Grattarola, and Cesare Alippi. "Spectral clustering with graph neural networks for graph pooling." International conference on machine learning. PMLR, 2020. (Year: 2020).*

International Search Report (PCT/ISA/210) issued Oct. 4, 2023 by the International Searching Authority in International Patent Application No. PCT/KR2023/008460.

Written Opinion (PCT/ISA/237) issued Oct. 4, 2023 by the International Searching Authority in International Patent Application No. PCT/KR2023/008460.

Yang, Yulei et al., "NENN: Incorporate Node and Edge Features in Graph Neural Network", Proceedings of Machine Learning Research, vol. 129, pp. 593-608, 2020. (16 pages total).

Yao, Yuhang et al., "Interpretable Clustering on Dynamic Graphs with Recurrent Graph Neural Networks", The Thirty-Fifth AAAI Conference on Artificial Intelligence (AAAI-21), Feb. 2021, pp. 4608-4616. (9 pages total).

* cited by examiner

ELECTRONIC APPARATUS FOR CLUSTERING GRAPH DATA ON BASIS OF GNN AND CONTROL METHOD THEREFOR

CROSS-REFERENCE TO RELATED APPLICATIONS

This application is a by-pass continuation application of International Application No. PCT/KR2023/008460, filed on Jun. 19, 2023, which is based on and claims priority to Korean Patent Application No. 10-2022-0101038, filed in the Korean Intellectual Property Office on Aug. 12, 2022, and Korean Patent Application No. 10-2022-0130052, filed in the Korean Intellectual Property Office on Oct. 11, 2022, the disclosures of which are incorporated by reference herein in their entireties.

BACKGROUND

1. Field

The disclosure relates to an electronic apparatus and a control method therefor, and more particularly, to an electronic apparatus that clusters graph data including edges and nodes based on a graph neural network (GNN), and a control method therefor.

2. Description of Related Art

Clustering means grouping graph data that is similar or interrelated. Recently, clustering is used in various services. For example, it can be determined to which group a specific user belongs through clustering, and a service can be provided based on the characteristic of the group.

In the conventional clustering method, clustering was performed based on simple rules. For example, in the conventional clustering method, a plurality of users (or user terminals) that accessed the same IP were determined as the same cluster. Accordingly, there were problems that accuracy of clustering was low such as users having relatively low relevance belonging to the same cluster, and the method could not be used for providing various services.

Accordingly, there is a need for new clustering technologies.

SUMMARY

According to an aspect of the disclosure, a control method for an electronic apparatus includes, obtaining, based on log data of a plurality of devices, a first graph including first information regarding a plurality of devices and second information regarding relevance among the plurality of devices; obtaining an edge-based second graph based on the first graph such that a second plurality of edges of the second graph include a first plurality of edges of the first graph, and the second plurality of edges includes third information regarding a plurality of clustering rules from the first plurality of edges of the first graph; converting the second graph into a node-based third graph such that a third plurality of nodes of the third graph include the third information; converting the third information from the third plurality of nodes into a plurality of probability labels of the third plurality of nodes, wherein a probability label indicates relevance between two devices from among the plurality of devices; converting the third graph into an edge-based fourth graph such that a fourth plurality of edges of the fourth graph include the plurality of probability labels from the third plurality of nodes; and clustering the plurality of devices into a plurality of groups based on the first graph and the fourth graph.

The obtaining the first graph may include obtaining, based on the log data, an initial graph including an initial plurality of nodes and an initial plurality of edges among the initial plurality of nodes; obtaining the first information based on fourth information regarding the plurality of devices, and obtaining the second information based on fifth information regarding a plurality of pairs of the plurality of devices; and obtaining the first graph based on the initial graph such that a first plurality of nodes of the first graph include the initial plurality of nodes, and the first plurality of nodes further include the first information, and the first plurality of edges include the initial plurality of edges, and the first plurality of edges further include the second information.

The plurality of clustering rules may determine relevance between the two devices from among the plurality of devices. The third information may include a first label based on determining relevance exists between the two devices, a second label based on determining relevance does not exist between the two devices, and a third label based on relevance between the two devices not being determined. The third information may include a first label set including at least two labels from among the first label and the third label.

The control method may further include, based on a first node from among the third plurality of nodes in the third graph including a second label set that includes only the third label, converting the first node into a second node including one from among the first label and the second label based on at least one node connected with the first node.

The converting the second graph into the third graph may include, based on the second plurality of edges having directivity, converting the second graph into the third graph such that only nodes corresponding to edges toward a same node among the second plurality of edges are connected with each other by the edges.

The converting the second graph into the third graph may include deleting an edge from among a third plurality of edges based on a Jaccard index of the edge being less than or equal to a predetermined value.

The converting the third information into the plurality of probability labels may include obtaining the plurality of probability labels based on the third information through weak supervised learning; and converting the third information into the plurality of probability labels.

The clustering the plurality of devices into the plurality of groups may include obtaining a plurality of reliability scores, wherein a reliability score predicts a level of relation between two devices based on the second information of the first graph and a corresponding probability label of the fourth graph; and clustering the plurality of devices into the plurality of groups based on the plurality of reliability scores.

The clustering the plurality of devices into the plurality of groups may include clustering the plurality of devices into the plurality of groups based on a community detection algorithm.

According to an aspect of the disclosure, an electronic apparatus includes one or more processors; and memory storing instructions that, when executed by the one or more processors, causes the electronic apparatus to obtain, based on log data of a plurality of devices, a first graph including first information regarding a plurality of devices and second information regarding relevance among the plurality of devices; obtain an edge-based second graph based on the first graph such that a second plurality of edges of the second graph include a first plurality of edges of the first graph, and the second plurality of edges include third information regarding a plurality of clustering rules from the first plurality of edges of the first graph; convert the second graph into a node-based third graph such that a third plurality of nodes of the third graph include the third information; convert the third information from the third plurality of nodes into a plurality of probability labels of the third plurality of nodes, wherein a probability label indicates relevance between two devices from among the plurality of devices; convert the third graph into an edge-based fourth graph such that a fourth plurality of edges of the fourth graph include the plurality of probability labels from the third plurality of nodes; and cluster the plurality of devices into a plurality of groups based on the first graph and the fourth graph.

The one or more processors may be configured to execute the instructions to cause the electronic apparatus to obtain, based on the log data, an initial graph including an initial plurality of nodes and an initial plurality of edges among the initial plurality of nodes; obtain the first information based on fourth information regarding the plurality of devices, and obtain the second information based on fifth information regarding a plurality of pairs of the plurality of devices; and obtain the first graph based on the initial graph such that a first plurality of nodes of the first graph include the initial plurality of nodes of the initial graph, and the first plurality of nodes may further include the first information, and the first plurality of edges include the initial plurality of edges, and the first plurality of edges may further include the second information.

The plurality of clustering rules may determine relevance between the two devices from among the plurality of devices. The third information may include a first label based on determining relevance exists between the two devices, a second label based on determining relevance does not exist between the two devices, and a third label based on relevance between the two devices not being determined. The third information may include a first label set including at least two labels from among the first label and the third label.

The one or more processors may be further configured to execute the instructions to cause the electronic apparatus to, based on a first node from among the third plurality of nodes in the third graph including a second label set that includes only the third label, convert the first node into a second node including one from among the first label and the second label based on at least one node connected with the first node.

The one or more processors may be configured to execute the instructions to cause the electronic apparatus to, based on the second plurality of edges having directivity, convert the second graph into the third graph such that only nodes corresponding to edges toward a same node among the second plurality of edges are connected with each other by the edges.

The one or more processors may be configured to execute the instructions to cause the electronic apparatus to delete an edge from among a third plurality of edges of the third graph based on a Jaccard index of the edge being less than or equal to a predetermined value.

BRIEF DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

Figure 1:
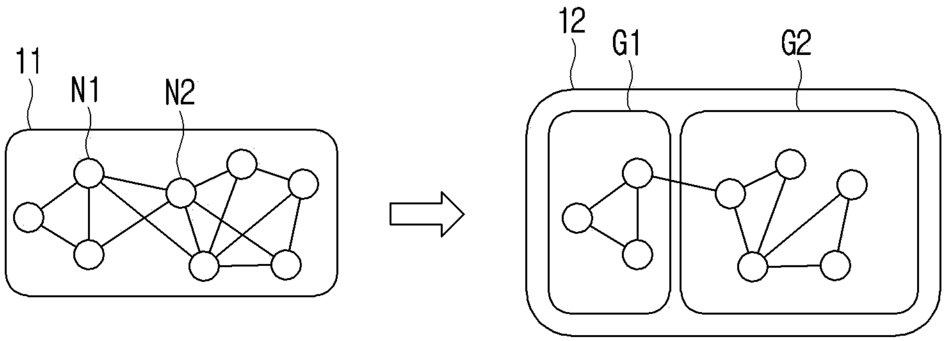
FIG. 1 is a diagram for illustrating a concept of clustering according to an embodiment of the disclosure.

The embodiments described in the disclosure, and the configurations shown in the drawings, are only examples of embodiments, and various modifications may be made without departing from the scope and spirit of the disclosure.

Various modifications may be made to the embodiments of the disclosure, and there may be various types of embodiments. Accordingly, embodiments will be illustrated in drawings, and the embodiments will be described in detail in the detailed description. However, it should be noted that the various embodiments are not for limiting the scope of the disclosure to an embodiment, but they should be interpreted to include all modifications, equivalents, and/or alternatives of the embodiments of the disclosure. Also, with respect to the detailed description of the drawings, similar components may be designated by similar reference numerals.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, the terms used in the disclosure are used just to explain embodiments of the disclosure, and are not intended to limit the scope of the disclosure. Also, singular expressions include plural expressions, unless defined obviously differently in the context.

Also, in the disclosure, expressions such as "have," "may have," "include," and "may include" denote the existence of such characteristics (e.g.: elements such as numbers, functions, operations, and components), and do not exclude the existence of additional characteristics.

Further, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second," and the like used in the disclosure may describe various elements regardless of any order and/or degree of importance. Also, such expressions are used only to distinguish one element from another element, and are not intended to limit the elements.

The description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

In contrast, the description that one element (e.g.: a first element) is "directly coupled" or "directly connected" to another element (e.g.: a second element) can be interpreted to mean that still another element (e.g.: a third element) does not exist between the one element and the another element.

Also, the expression "configured to" used in the disclosure may be interchangeably used with other expressions such as "suitable for," "having the capacity to," "designed to," "adapted to," "made to," and "capable of," depending on cases. The term "configured to" may not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Also, in the embodiments of the disclosure, 'a module' or 'a part' may perform at least one function or operation, and may be implemented as hardware or software, or as a combination of hardware and software. Also, a plurality of 'modules' or 'parts' may be integrated into at least one module and such functionality may be performed by at least one processor.

Various elements and areas in the drawings were illustrated schematically. Accordingly, the technical idea of the disclosure is not limited by the relative sizes or intervals illustrated in the accompanying drawings.

Hereinafter, embodiments according to the disclosure will be described in detail with reference to the accompanying drawings, such that those having ordinary skill in the art to which the disclosure belongs can carry out the embodiments.

FIG. 1 is a diagram for illustrating a concept of clustering according to an embodiment of the disclosure.

Referring to FIG. 1, the electronic apparatus 100 may obtain an initial graph 11. The initial graph 11 includes information regarding a relation among a plurality of devices connected with the electronic apparatus 100. Nodes of the initial graph 11 correspond to the plurality of devices, and edges indicate relevance between two devices. In FIG. 1, the initial graph 11 is expressed by schematizing it, but the initial graph 11 may be expressed as a vector. The initial graph 11 may be expressed as a vector consisting of identification information of devices corresponding to each node, and values indicating whether the plurality of devices are related. For example, the vector corresponding to the initial graph 11 may include an identification value ID1 of a first device corresponding to a first node N1, an identification value ID2 of a second device corresponding to a second node N2, and a vector indicating that the first device and the second device are related.

The electronic apparatus 100 may generate the initial graph 11 based on log data recorded in a log data DB. The log data may include the time when the plurality of devices were connected with the electronic apparatus 100, identification information of the devices, and IP addresses to which the devices are connected. The electronic apparatus 100 may generate the initial graph 11 by identifying devices that have a history of having been connected to the same IP address. For example, the electronic apparatus 100 may connect the first node N1 and the second node N2 respectively corresponding to the first device and the second device that have a history of having been connected to the same IP address.

A conventional clustering system defined devices corresponding to each node as the same group (or cluster) based on the number of nodes included in the initial graph 11. In case the number of nodes included in the initial graph 11 was smaller than a predetermined number, the clustering system defined the devices corresponding to each node as the same group. Also, the clustering system provided contents to the devices based on the group to which each device belonged. For example, when the clustering system provided contents to the first device and the second device, the clustering system provided interrelated contents as it determined that the two devices belonged to the same group.

However, according to a conventional service system that defines groups based on a simple rule such as the number of nodes, devices that have low relevance in actuality may be defined as the same group. For example, the first device and the second device may have a history of having accessed the same IP address, but they may be terminals of users who do not have any relevance. In this case, if interrelated contents are provided to the first device and the second device, inconvenience may be caused to the users.

Supervised learning has been utilized by using clusters that existed in a small scale. However, in case clustering was performed by such a method, low accuracy was exhibited.

Accordingly, according to an embodiment of the disclosure, the electronic apparatus 100 may cluster graph data including a plurality of edges and a plurality of nodes into a plurality of groups by using weak supervised learning and a graph neural network (GNN). A clustering system constructs information regarding a plurality of clustering rules by ensembling a plurality of simple clustering rules extracted from a data domain expert in a graph. The clustering system predicts clusters through machine learning using the information regarding the plurality of clustering rules. If such a clustering system is utilized, clusters are constructed by extracting and ensembling simple rules from graph data, and accordingly, accurate transmission of advertisements and provision of contents can become possible.

As an example, the electronic apparatus 100 may obtain a final graph 12 by performing clustering based on the initial graph 11. Some of the nodes included in the initial graph 11 may be defined as different groups in the final graph 12. For example, the first device may belong to a first group G1, and the second device may belong to a second group G2. Accordingly, interrelated contents may not be provided to the first device and the second device belonging to different groups.

Figure 2:
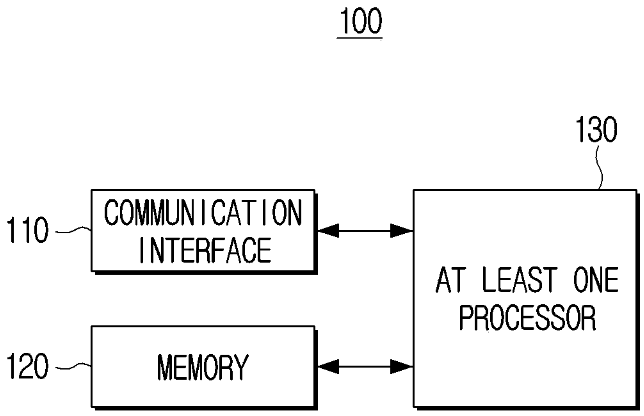
FIG. 2 is a block diagram illustrating components of an electronic apparatus according to an embodiment of the disclosure.

FIG. 2 is a block diagram illustrating components of an electronic apparatus according to an embodiment of the disclosure.

Referring to FIG. 2, the electronic apparatus 100 may include a communication interface 110, memory 120, and at least one processor 130. For example, the electronic apparatus 100 may be a server. However, this is merely an example, and the electronic apparatus 100 may be a user terminal. The components of the electronic apparatus 100 are not limited to the components illustrated in FIG. 2, and components that are obvious to those skilled in the art can obviously be further included.

The communication interface 110 may include at least one circuit, and perform communication with various types of external apparatuses according to various types of communication methods. As an example, the communication interface 110 may receive information regarding a plurality of devices from an external server. The information regarding the plurality of devices may include identification information for the plurality of devices, information regarding the relevance among the plurality of devices, etc. As another example, the communication interface 110 may transmit contents to devices. The communication interface 110 may include at least one of a Wi-Fi module, a Bluetooth module, a Zigbee module, a beacon module, a cellular communication module, a third generation (3G) mobile communication module, a fourth generation (4G) mobile communication module, a fourth generation long term evolution (LTE) communication module, or a fifth generation (5G) mobile communication module.

The memory 120 may store an operating system (OS) for controlling the overall operations of the components of the electronic apparatus 100 and instructions or data related to the components of the electronic apparatus 100. Also, the memory 120 may store data for a module for controlling the operations of the electronic apparatus 100 to perform various types of operations.

Figure 3:
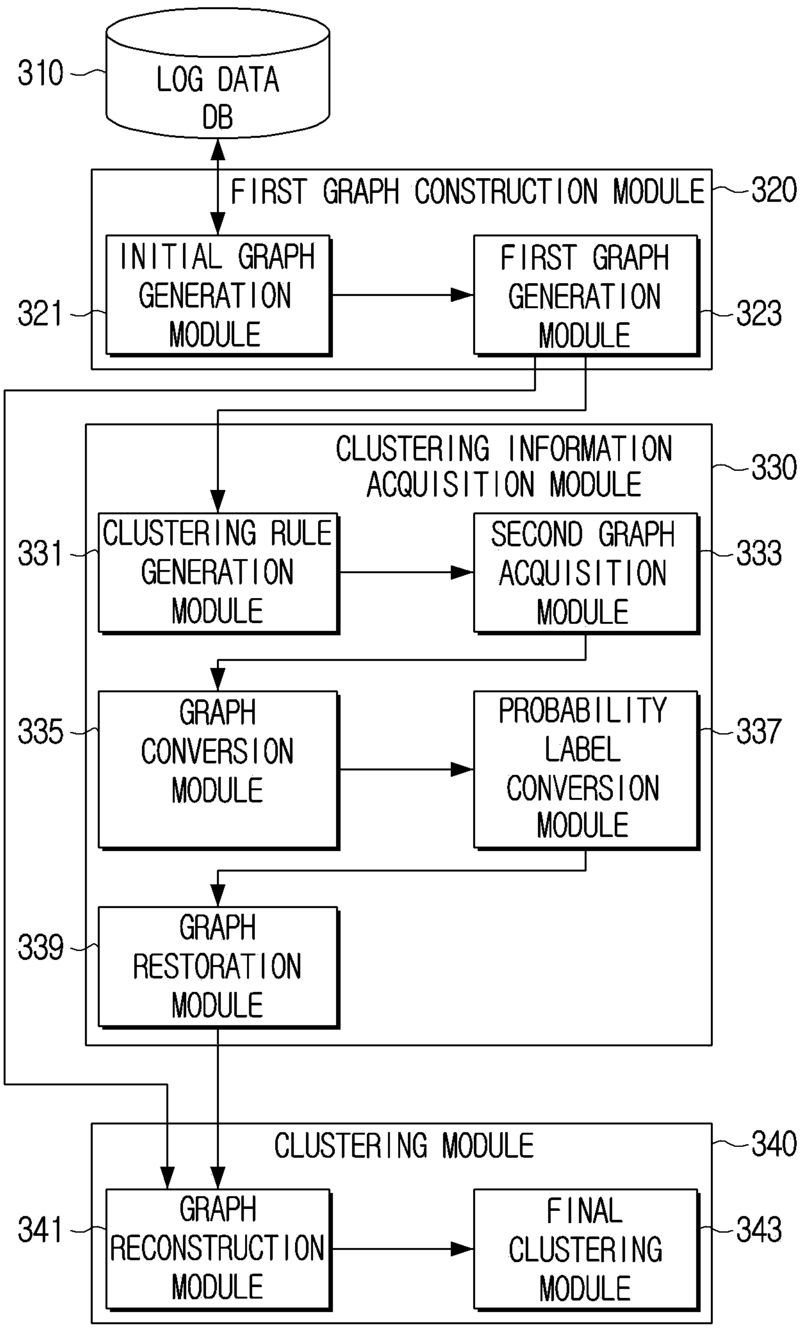
FIG. 3 is a block diagram illustrating components for device clustering according to an embodiment of the disclosure.

The module for controlling the operations of the electronic apparatus 100 may include a first graph construction module 320, a clustering information acquisition module 330, and a clustering module 340 as illustrated in FIG. 3. Here, the first graph construction module 320 may include an initial graph generation module 321 and a first graph generation module 323. The clustering information acquisition module 330 may include a clustering rule generation module 331, a second graph acquisition module 333, a graph change module 335, a probability label conversion module 337, and a graph restoration module 339. The clustering module 340 may include a graph reconstruction module 341 and a final clustering module 343.

The memory 120 may include non-volatile memory that can maintain the stored information even if power supply is stopped, and volatile memory that uses constant power supply for maintaining the stored information. The module for clustering devices may be stored in the non-volatile memory.

Also, the memory 120 may include at least one neural network model for clustering a plurality of devices. As an example, the memory 120 may include a neural network model for obtaining a probability label based on information regarding a plurality of clustering rules.

The memory 120 may store a log data DB 310 wherein log data of devices connected with the electronic apparatus 100 is stored. The log data of the devices may include the time when the devices were connected with the electronic apparatus 100, identification information of the devices, IP addresses that the devices accessed, etc.

The memory 120 may be implemented as non-volatile memory (ex.: a hard disc, a solid state drive (SSD), flash memory), volatile memory, etc.

The at least one processor 130 controls the overall operations of the electronic apparatus 100. The at least one processor 130 may be connected with the components of the electronic apparatus 100 including the memory 120, and may control the overall operations of the electronic apparatus 100 by executing the at least one instruction stored in the memory 120 as described above.

If an event for clustering devices is detected, the at least one processor 130 may load data for a module for clustering the devices stored in the non-volatile memory to perform various types of operations on the volatile memory. The at least one processor 130 may perform various types of operations by using various types of modules based on the data loaded on the volatile memory. Here, loading means an operation of calling in data stored in the non-volatile memory to the volatile memory and storing the data, such that the at least one processor 130 can access the data.

The at least one processor 130 obtains a first graph including first information regarding each of a plurality of devices and second information regarding relevance among the plurality of devices based on log data of the plurality of devices. Then, the at least one processor 130 obtains an edge-based second graph including information regarding a plurality of clustering rules in a plurality of edges included in the first graph. Then, the at least one processor 130 converts the second graph into a node-based third graph such that the information regarding the plurality of clustering rules included in a plurality of edges of the second graph is included in a plurality of nodes. Then, the at least one processor 130 converts the information regarding the plurality of clustering rules included in a plurality of nodes of the third graph into a probability label indicating relevance between two devices. Then, the at least one processor 130 converts the third graph into an edge-based fourth graph such that the probability label included in the plurality of nodes of the third graph is included in a plurality of edges. Then, the at least one processor 130 clusters the plurality of devices into a plurality of groups by using the first graph and the fourth graph.

The at least one processor 130 may obtain an initial graph including a plurality of nodes and edges among the plurality of nodes based on the log data. Then, the at least one processor 130 may obtain the first information based on the information regarding the plurality of devices, and obtain the second information based on the information regarding the plurality of device pairs. Then, the at least one processor 130 may obtain the first graph including the first information in the plurality of nodes included in the initial graph, and the second information in the edges among the plurality of nodes included in the initial graph.

Each of the plurality of clustering rules is a rule for determining relevance between two devices, and here, the information regarding the clustering rules may include a first label (or a positive label) if it is determined that relevance exists between the two devices, and include a second label (or a negative label) if it is determined that relevance does not exist between the two devices, and include a third label (or an abstain level) if relevance between the two devices is not determined. Also, the information regarding the plurality of clustering rules may include a label set including at least two of the first or third label.

Also, in case a node including at least one third label in a label set exists among the plurality of nodes included in the third graph, the at least one processor 130 may convert the node including the third label into a node including the first or second label in the label set by using at least one node connected with the node including the third label.

In addition, in case the plurality of edges included in the second graph are edges having directivity, the at least one processor 130 may, regarding the plurality of nodes included in the third graph, convert the second graph into the third graph such that only nodes corresponding to edges toward the same node among the plurality of edges included in the second graph are connected with each other by the edges.

Further, the at least one processor 130 may delete an edge of which Jaccard index is smaller than or equal to a predetermined value among a plurality of edges included in the third graph.

Also, the at least one processor 130 may obtain a probability label indicating relevance between the devices based on the information regarding the plurality of clustering rules included in the plurality of nodes through weak supervised learning. Then, the at least one processor 130 may convert the information regarding the plurality of clustering rules included in the plurality of nodes of the third graph into a probability label indicating relevance between the devices.

Then, the at least one processor 130 may obtain a reliability score predicting a relation between two devices based on second information included in the first graph and a probability label included in the fourth graph. Then, the at least one processor 130 may cluster the plurality of devices into the plurality of groups based on the obtained reliability score.

Also, the at least one processor 130 may cluster the plurality of devices into the plurality of groups by using a community detection algorithm.

Hereinafter, a method for the electronic apparatus 100 to cluster a plurality of devices will be described with reference to FIG. 3 to FIG. 15.

FIG. 3 is a block diagram illustrating components for device clustering according to an embodiment of the disclosure. As illustrated in FIG. 3, the electronic apparatus 100 may include a first graph construction module 320, a clustering information acquisition module 330, and a clustering module 340. Here, the first graph construction module 320 may include an initial graph generation module 321 and a first graph generation module 323. The clustering information acquisition module 330 may include a clustering rule generation module 331, a second graph acquisition module 333, a graph change module 335, a probability label conversion module 337, and a graph restoration module 339. The clustering module 340 may include a graph reconstruction module 341 and a final clustering module 343.

The initial graph generation module 321 may generate an initial graph based on log data stored in a log data DB 310. Here, the log data stored in the log data DB 310 may include the time when the devices were connected with the electronic apparatus 100, identification information of the devices, and addresses of IPs to which the devices are connected and the time of connection, etc. A plurality of nodes included in the initial graph may correspond to each of the plurality of devices, and edges connecting among the plurality of nodes may indicate relevance between two devices corresponding to two connected nodes.

The initial graph generation module 321 may generate an initial graph based on information that devices accessed IPs. Here, the initial graph generation module 321 may generate a graph based on a simple rule. The electronic apparatus 100 may generate an initial graph by identifying devices that have a history of having been connected to the same IP address.

Figure 4:
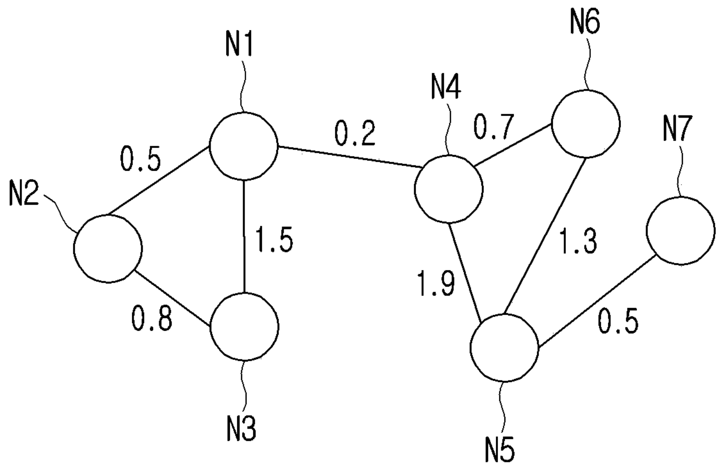
FIG. 4 is a diagram illustrating an initial graph according to an embodiment of the disclosure.

For example, as illustrated in FIG. 4, the electronic apparatus 100 may connect the second node N2, the third node N3, and the fourth node N4 respectively corresponding to the second device, the third device, and the fourth device that have a history of having been connected to the same IP address as the first device to the first node N1. Here, edges connecting the nodes may include information regarding the time or the number of times that the devices were connected to the same IP address among the plurality of devices. In the edges connecting the nodes, values that were calculated based on the time or the number of times that the devices were connected to the same IP address among the plurality of devices may be stored.

The first graph generation module 323 may obtain the first information based on the information regarding the plurality of devices, and obtain the second information based on the information regarding the plurality of device pairs.

Here, the information regarding the plurality of devices may include information regarding at least one of the types (e.g., a TV, a laptop PC) or a use pattern of the devices. The use pattern of the devices may be related to the time when the devices were used (e.g., morning, noon, evening, etc.). The first information may be implemented as a first feature vector, and for example, the first column of the first feature vector may include information regarding the types of the devices, the second column may include information regarding the number of IP addresses to which the devices were connected during one month, and the third column may include information regarding the use pattern of the devices.

Also, the information regarding the plurality of device pairs may include at least one of similarity of IP connection patterns of two devices constituting a pair, the type of a device pair, or similarity of use patterns. The IP connection patterns of a device pair may be related to at least one of the number of times that the two devices were connected to the same IP address during a period (e.g., one month) or the time when the two devices are connected to the same IP address. The type of a device pair means a pair of the types of each of the two devices (e.g., a TV-a smartphone). The use patterns of a device pair may be related to at least one of the use time of the two devices or contents output from the two devices. Here, the second information may be implemented as a second feature vector, and for example, the first column of the second feature vector may indicate similarity of IP connection patterns of two devices constituting a pair, and the second column may indicate the types of two devices constituting a pair, and the third column may indicate similarity of use patterns of two devices constituting a pair.

Figure 5:
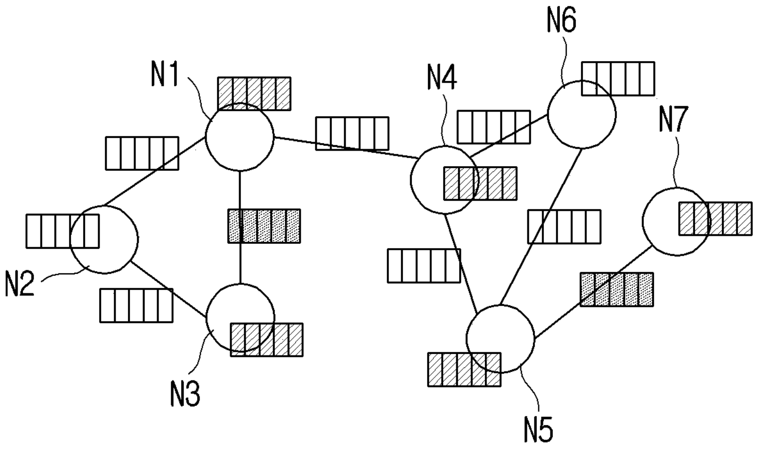
FIG. 5 is a diagram illustrating a first graph according to an embodiment of the disclosure.

The first graph generation module 323 may obtain a first graph including first information on a plurality of nodes included in the initial graph, and second information on edges among the plurality of nodes included in the initial graph. For example, as illustrated in FIG. 5, the first feature vector corresponding to information regarding each of a first device to a seventh device may be included in a first node to a seventh node N1-N7 corresponding to the first device to the seventh device, and the second feature vector corresponding to information regarding the connected device pairs may be included in a plurality of edges connecting the first node to the seventh node N1-N7.

The clustering rule generation module 331 may generate clustering rules for determining relevance between two devices. Here, the clustering rules may be generated based on domain knowledge. The first clustering rule may be a family clustering rule using similarity of IP access history, and the second clustering rule may be a family clustering rule using IP access log information, and the third clustering rule may be a family clustering rule using device graph structural information, but the disclosure is not limited thereto.

As an example, the clustering rule generation module 331 may generate clustering rules as follows.

Rule 1: sorensen_dist(ip history)>0.8 then 1

Rule 2: ip_weight>1.0 then 1

Rule 3: neighbor count>100 then 0

Rule 4: predicted label by using predefined model

Figure 6:
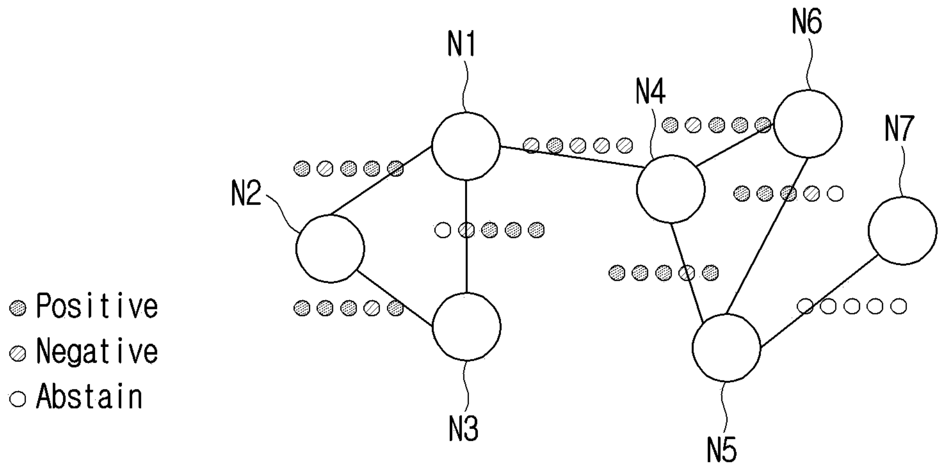
FIG. 6 is a diagram illustrating a second graph including information on a plurality of clustering rules according to an embodiment of the disclosure.

The second graph acquisition module 333 may obtain an edge-based second graph including information regarding a plurality of clustering rules in a plurality of edges included in the first graph. The second graph may include information regarding a plurality of clustering rules in edges connecting the plurality of nodes corresponding to the plurality of devices. The information regarding the clustering rules may include a first label (e.g., 1) if it is determined that relevance exists between the two devices, and include a second label (e.g., 0) if it is determined that relevance does not exist between the two devices, and include a third label (e.g., −1) if relevance between the two devices is not determined according to the clustering rules generated by the clustering rule generation module 331. Accordingly, the information regarding the plurality of clustering rules may include a label set including at least two of the first or third label. For example, in case there are five clustering rules generated by the clustering rule generation module 331, information regarding the plurality of clustering rules including five of the first to third labels may be included in the edges connecting the plurality of nodes. As illustrated in FIG. 6, information regarding the plurality of clustering rules including a first label set of (1,0,1,1,1) may be included in the first edge between the first node N1 and the second node N2, and information regarding the plurality of clustering rules including a second label set of (1,1,1,0,1) may be included in the second edge between the second node N2 and the third node N3, and information regarding the plurality of clustering rules including a third label set of (−1,0,1,1,1) may be included in the third edge between the first node N1 and the third node N3, and information regarding the plurality of clustering rules including a fourth label set of (0,1,0,0,0) may be included in the fourth edge between the first node N1 and the fourth node N4, and information regarding the plurality of clustering rules including a fifth label set of (1,1,1,0,1) may be included in the fifth edge between the fourth node N4 and the fifth node N5, and information regarding the plurality of clustering rules including a sixth label set of (1,0,1,1,1) may be included in the sixth edge between the fourth node N4 and the sixth node N6, and information regarding the plurality of clustering rules including a seventh label set of (1,1,1,0,−1) may be included in the seventh edge between the fifth node N5 and the sixth node N6, and information regarding the plurality of clustering rules including an eighth label set of (−1,−1,−1,−1,−1) may be included in the eighth edge between the fifth node N5 and the sixth node N6→the seventh node N7. As illustrated in FIG. 5, the second graph acquisition module 333 may obtain an edge-based second graph including information regarding the plurality of clustering rules on eight edges connecting two nodes.

The graph conversion module 335 may convert the second graph into a node-based third graph such that the information regarding the plurality of clustering rules included in the plurality of edges of the second graph are included in the plurality of nodes. The graph conversion module 335 may convert the graph such that the information regarding the plurality of clustering rules included in the edges are included in the nodes.

Figure 7:
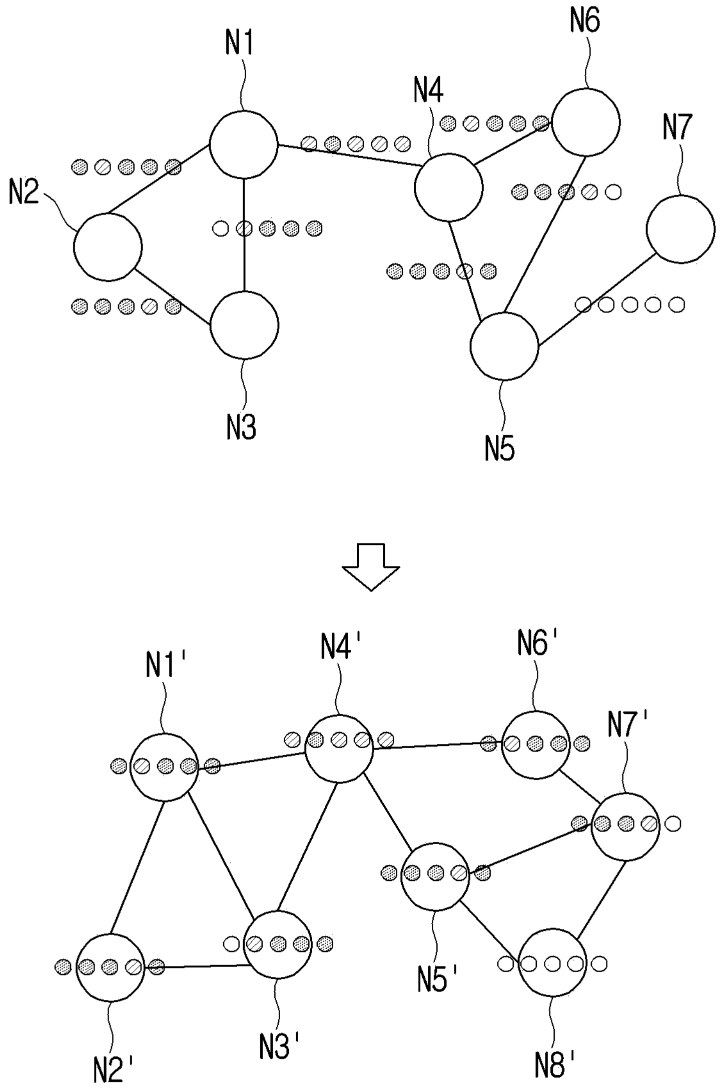
FIG. 7 is a diagram for illustrating a method of converting an edge-based second graph into a node-based third graph according to an embodiment of the disclosure.

As an example, as illustrated in FIG. 7, the graph may be changed such that the eight label sets included in the second graph are included in the plurality of nodes N'1-N'8 of the third graph. The first label set included in the first edge connecting between the first node N1 and the second node N2 of the second graph may be included in the first node N'1 included in the third graph, and the second label set included in the second edge connecting between the second node N2 and the third node N3 of the second graph may be included in the second node N'2 included in the third graph, and the third label set included in the third edge connecting between the first node N1 and the third node N3 of the second graph may be included in the third node N'3 included in the third graph, and the fourth label set included in the fourth edge connecting between the first node N1 and the fourth node N4 of the second graph may be included in the fourth node N'4 included in the third graph, and the fifth label set included in the fifth edge connecting between the fourth node N4 and the fifth node N5 of the second graph may be included in the fifth node N'5 included in the third graph, and the sixth label set included in the sixth edge connecting between the fourth node N4 and the sixth node N6 of the second graph may be included in the sixth node N'6 included in the third graph, and the seventh label set included in the seventh edge connecting between the fifth node N5 and the sixth node N6 of the second graph may be included in the seventh node N'7 included in the third graph, and the eighth label set included in the eighth edge connecting between the fifth node N5 and the seventh node N7 of the second graph may be included in the eighth node N'8 included in the third graph.

Here, the nodes included in the third graph may be connected by edges based on the nodes included in the second graph. For example, as the first edge and the third edge of the second graph respectively corresponding to the first node N'1 and the third node N'3 of the third graph are connected to the first node N, the first node N'1 and the third node N'3 of the third graph may be connected by the edges. However, as the second edge and the fourth edge of the second graph respectively corresponding to the second node N'2 and the fourth node N'4 of the third graph do not have a node that they share, the second node N'2 and the fourth node N'4 of the third graph are not connected by the edges.

In case the plurality of edges included in the second graph are edges having directivity, the graph conversion module 335 may, regarding the plurality of nodes included in the third graph, convert the second graph into the third graph such that only nodes corresponding to edges toward the same node among the plurality of edges included in the second graph are connected with each other by the edges.

Figure 8:
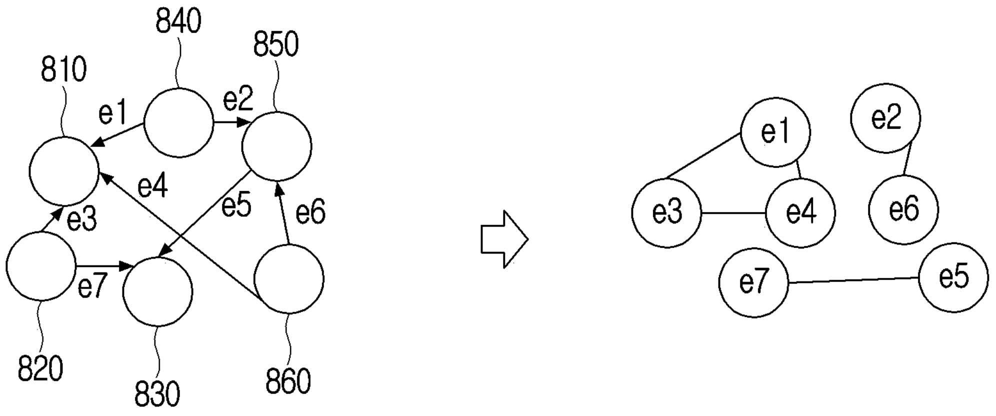
FIG. 8 is a diagram for illustrating a method of converting a second graph including a plurality of edges having directivity into a node-based third graph according to an embodiment of the disclosure.

As an example, the left side of FIG. 8 is a drawing that illustrates the second graph including a plurality of edges having directivity. Here, when the second graph illustrated on the left side of FIG. 8 is changed to the third graph illustrated on the right side of FIG. 8, the plurality of edges e1 to e7 of the second graph illustrated on the left side of FIG. 8 may be changed to the plurality of nodes of the third graph illustrated on the right side of FIG. 8. Here, the graph conversion module 335 may generate edges only among the nodes of the third graph corresponding to edges toward the same node among the plurality of edges included in the second graph. As illustrated on the left side of FIG. 8, in case the first edge e1, the third edge e3, and the fourth edge e4 are toward the first node 810, the graph conversion module 335 may generate edges among the first node e1, the third node e3, and the fourth node e4 of the third graph corresponding to the first edge e1, the third edge e3, and the fourth edge e4, as illustrated on the right side of FIG. 8. However, as illustrated on the left side of FIG. 8, the first edge e1 and the second edge e2 share the same fourth node 840, but the first edge e1 and the second edge e2 are not toward the same node, and thus the graph conversion module 335 may not generate edges between the first node e1 and the second node e2 of the third graph corresponding to the first edge e1 and the second edge e2, as illustrated on the right side of FIG. 8.

Also, the graph conversion module 335 may delete edges of which Jaccard index is smaller than or equal to a predetermined value among the plurality of edges included in the third graph. The graph conversion module 335 may obtain a node set wherein the source of edges is the Nth node (src(e)=n) among the nodes around the Nth node of the third graph. Then, the graph conversion module 335 may delete edges of which Jaccard index is smaller than or equal to the predetermined value (e.g., 0.75) among the at least one edge connecting the node set.

Figure 9:
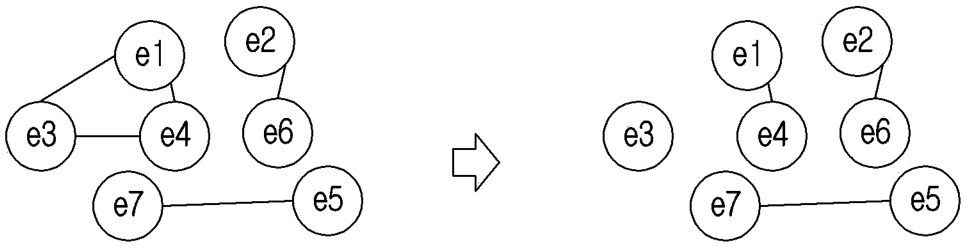
FIG. 9 is a diagram for illustrating a method of deleting at least one edge among a plurality of edges based on a Jaccard index according to an embodiment of the disclosure.

For example, as illustrated in FIG. 9, the graph conversion module 335 may obtain a node set (e1, e3, e4) wherein the source of edges is the first node among the nodes around the first node. Then, the graph conversion module 335 may delete edges of which Jaccard index is smaller than or equal to the predetermined value (e.g., the edge connecting the node e1 and the node e3, the edge connecting the node e3 and the node e4) among the edges connecting the node set (e1, e3, e4). As described above, by deleting edges of which Jaccard index is smaller than or equal to the threshold value, edges that make the third graph dense can be removed in advance when converting the second graph into the third graph, and thus the processing speed can be improved.

The method of converting the second graph including edges having directivity into the third graph as described above can be used for a bipartite graph such as a graph regarding data that measured movie preference of a user, etc.

Figure 10:
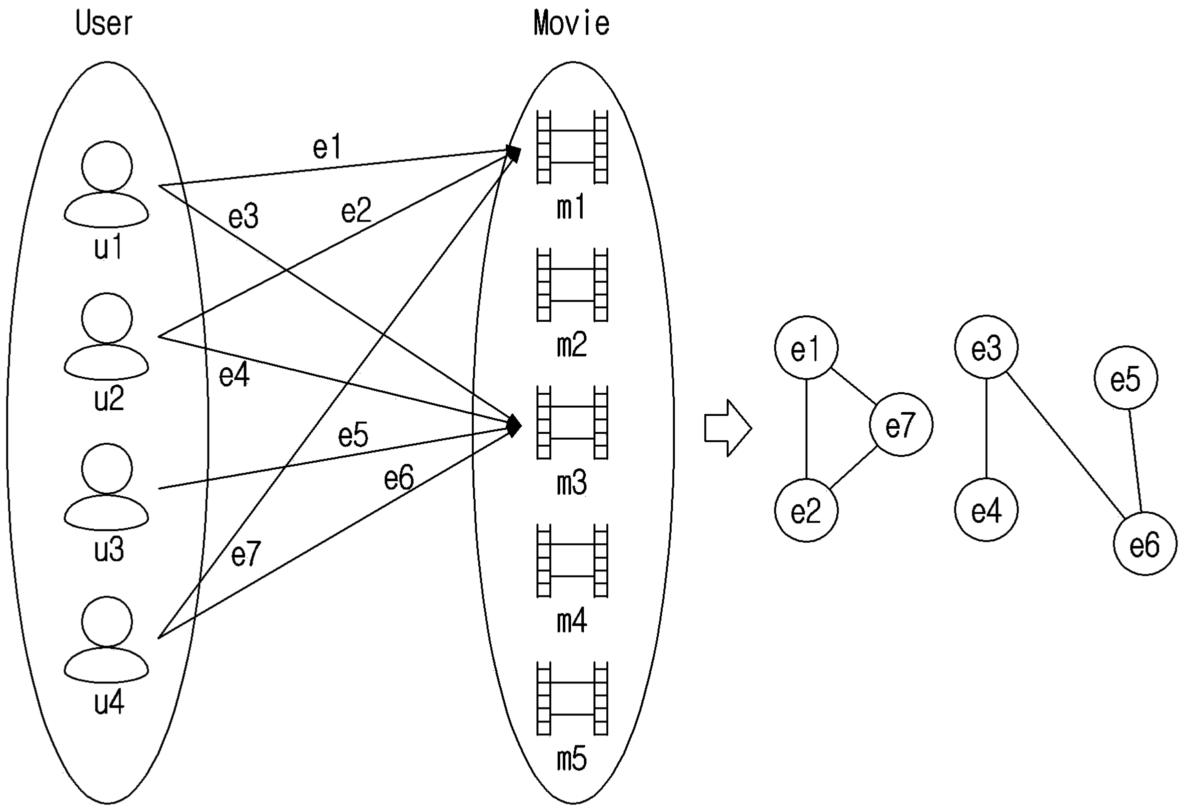
FIG. 10 is a diagram for illustrating a method of converting a graph in a movie recommendation graph according to an embodiment of the disclosure.

For example, as illustrated in the graph on the left side of FIG. 10, a plurality of users and a plurality of movies may be defined as nodes, and the relation of movie preference of the users may be defined as edges. As described above, the graph conversion module 335 may convert the second graph (the graph on the left side of FIG. 10) into the third graph (the graph on the right side of FIG. 10) such that only nodes corresponding to edges toward the same node are connected with each other by the edges. By removing at least some of the plurality of edges of the third graph by using the Jaccard index, generation of additional edges can be prevented. Through the third graph obtained as above, the electronic apparatus 100 can recommend new movies of interest of users.

In case a node including the third label in a label set exists among the plurality of nodes included in the third graph, the graph conversion module 335 may convert the node including the third label into a node including the first or second label in the label set by using at least one node connected with the node including the third label.

In case the third label (for example, a label indicating that relevance is not determined) is included in a label set among the plurality of nodes, the graph conversion module 335 may convert the node including the third label in the label set into a node including the first or second label in the label set by inputting information regarding the ambient nodes connected with the node including the third label into a trained neural network model (for example, a graph neural network (GNN)).

Figure 11:
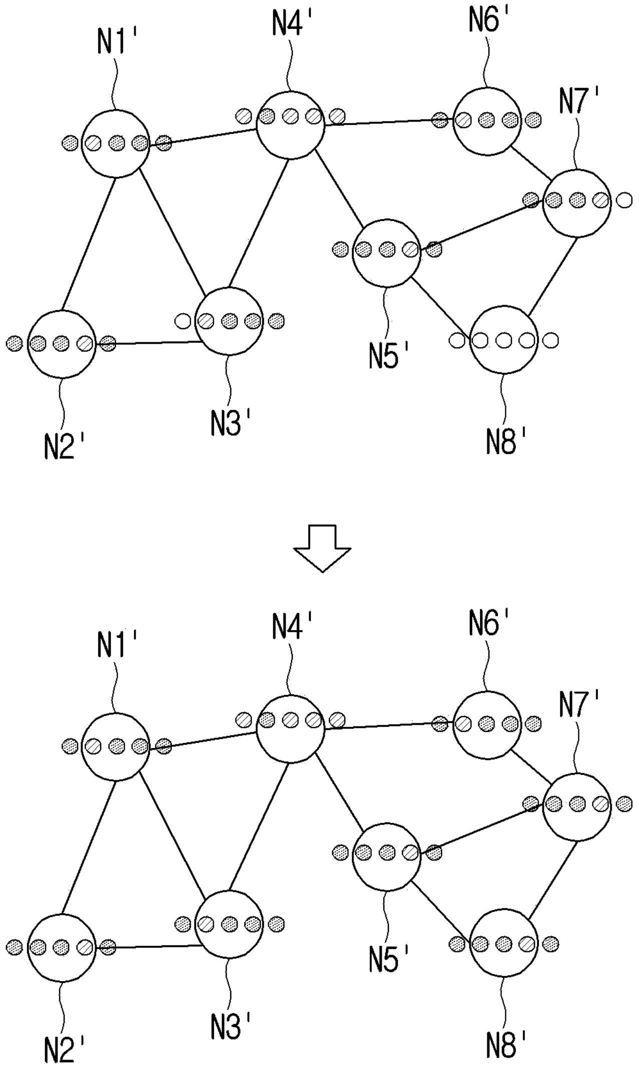
FIG. 11 is a diagram for illustrating a method of converting a node including a third label into a node including a first label or a second label according to an embodiment of the disclosure.

For example, as illustrated on the upper side of FIG. 11, the eighth node N'8 includes only the third label (−1) in the label set. Accordingly, the graph conversion module 335 may obtain information regarding the label set of the eighth node N'8 by inputting information regarding the sixth node N'6 and the seventh node N'7 connected with the eighth node N'8 into the GNN. The graph conversion module 335 may convert the eighth node N'8 to include a label set of (1,1,1,0,1) by using the GNN, as illustrated on the lower side of FIG. 11. Also, the graph conversion module 335 may convert the third label included in the third node N'3 and the seventh node N'7 into the first label by inputting information regarding the ambient nodes into the GNN.

As described above, by changing the node including the third label into a node including the first or second label, a label set including the first or second label can be constructed on the plurality of nodes included in the third graph. Accordingly, a probability label of the plurality of nodes included in the third graph can be obtained more accurately.

The probability label conversion module 337 may convert the information regarding the plurality of clustering rules included in the plurality of nodes of the third graph into a probability label indicating relevance between two devices. The probability label conversion module 337 may obtain a probability label indicating relevance between devices based on the information regarding the plurality of clustering rules included in the plurality of nodes of the third graph through weak supervised learning. Then, the probability label conversion module 337 may convert the information regarding the plurality of clustering rules included in the plurality of nodes of the third graph into a probability label indicating relevance between devices.

Here, weak supervised learning is a field of machine learning wherein a source that includes noises or is limited or is partially incorrect (a weak label) is used for designating a label for a data set of a large scale. According to an embodiment of the disclosure, the probability label conversion module 337 may obtain a probability label indicating relevance between devices based on the information regarding the plurality of clustering rules included in the plurality of nodes of the third graph through a snorkeling method.

Figure 12:
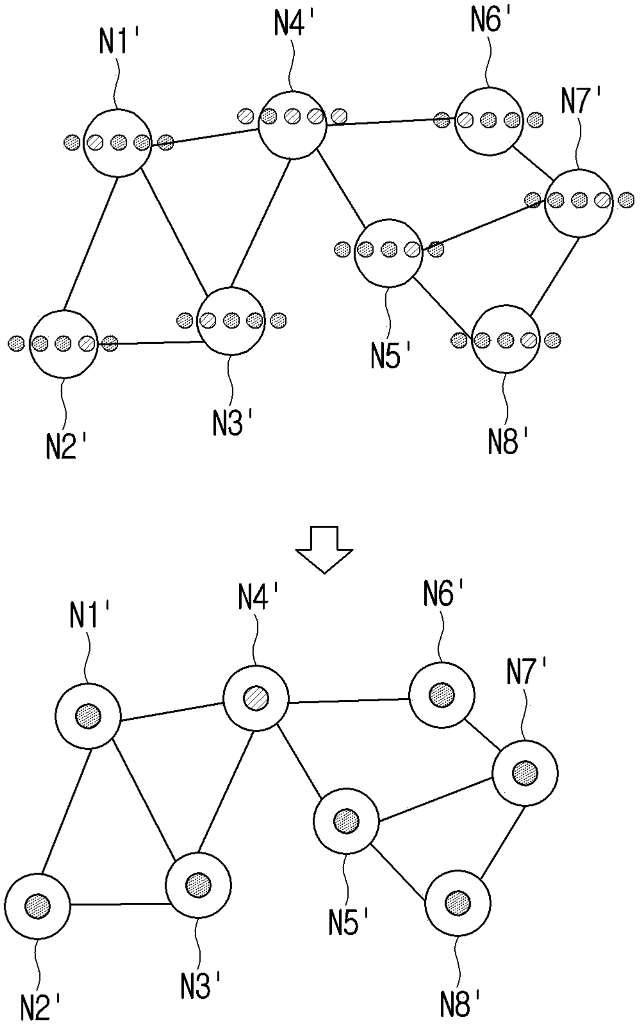
FIG. 12 is a diagram for illustrating a method of converting a label set included in a third graph into a probability label according to an embodiment of the disclosure.

For example, as illustrated in FIG. 12, through weak supervised learning, the probability label conversion module 337 may obtain a probability label of the first node (N'1) including a label set of (1,0,1,1,1) as 1, and obtain a probability label of the second node (N'2) including a label set of (1,1,1,0,1) as 1, and obtain a probability label of the third node (N'3) including a label set of (1,0,1,1,1) as 1, and obtain a probability label of the fourth node (N'4) including a label set of (0,1,0,0,0) as 1, and obtain a probability label of the fifth node (N'5) including a label set of (1,1,1,0,1) as 1, and obtain a probability label of the sixth node (N'6) including a label set of (1,0,1,1,1) as 1, and obtain a probability label of the seventh node (N'7) including a label set of (1,1,1,0,1) as 1, and obtain a probability label of the eighth node (N'8) including a label set of (1,1,1,0,1) as 1.

In the aforementioned embodiment, it was explained that a probability label is obtained by using weak supervised learning, but this is merely an example, and the probability label conversion module 337 may obtain a label in the biggest number among the plurality of labels included in each of the plurality of nodes as the probability label of each of the plurality of nodes.

Figure 13:
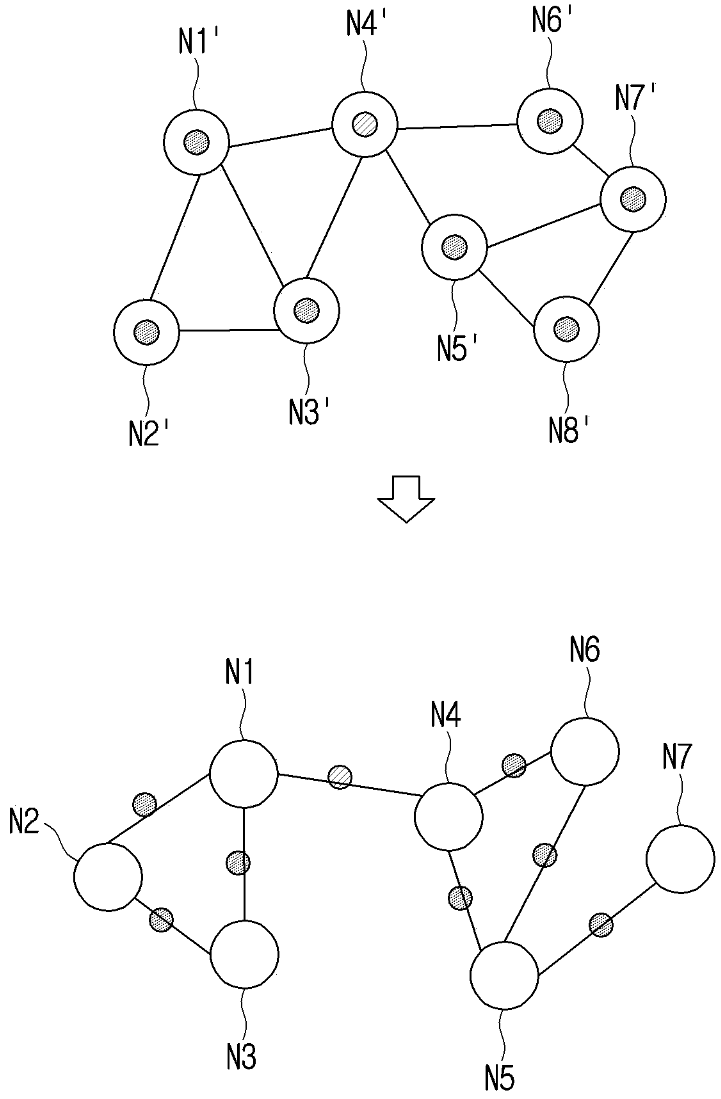
FIG. 13 is a diagram for illustrating a method of converting a node-based third graph into an edge-based fourth graph according to an embodiment of the disclosure.

The graph restoration module 339 may convert the third graph into an edge-based fourth graph such that probability labels included in the plurality of nodes of the third graph are included in the plurality of edges. For example, the graph restoration module 339 may convert the third graph including information regarding the probability labels in the plurality of nodes into the fourth graph including information regarding the probability labels in the plurality of edges, as illustrated in FIG. 13. The plurality of nodes included in the fourth graph may correspond to the plurality of devices as in the first or second graph, and the edges connecting the plurality of nodes of the fourth graph may include information regarding a probability label indicating relevance between two devices corresponding to the connected nodes.

The graph reconstruction module 341 may reconstruct a fifth graph (or a final graph) for final clustering by using the first graph and the fourth graph. The graph reconstruction module 341 may obtain a reliability score corresponding to a plurality of edges by inputting the second information (for example, the second feature vector) included in the plurality of edges of the first graph and the probability labels included in the plurality of edges of the fourth graph into a trained neural network model. Here, the reliability score may be a value between 0 and 1, but this is merely an example, and the score may be a value within a range.

Figure 14:
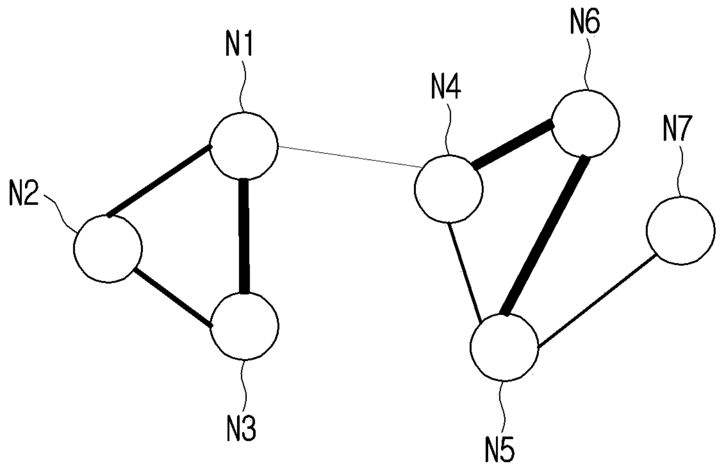
FIG. 14 is a diagram for illustrating a method of reconstructing a fifth graph according to a reliability score according to an embodiment of the disclosure.

The graph reconstruction module 341 may reconstruct the fifth graph based on the obtained reliability score. The plurality of nodes included in the fifth graph may correspond to the plurality of devices, and the plurality of edges included in the fifth graph may include information regarding the obtained reliability score as described above. The graph reconstruction module 341 may obtain the fifth graph including the first to seventh nodes, and edges connecting them, as illustrated in FIG. 14. Here, the thickness of the edges may correspond to the reliability score. As the reliability score is higher, the thickness of the edges may be thicker, and as the reliability score is lower, the thickness of the edges may be thinner.

Figure 15:
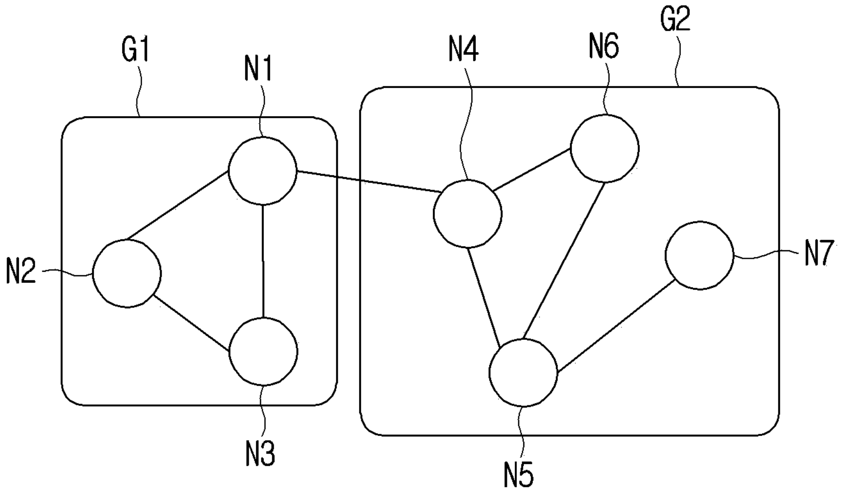
FIG. 15 is a diagram for illustrating a method of clustering a plurality of devices into a plurality of groups by using a fifth graph according to an embodiment of the disclosure.

The final clustering module 343 may cluster the plurality of devices into a plurality of groups by using the obtained fifth graph. The final clustering module 343 may cluster nodes connected by edges including a reliability score greater than or equal to a threshold value (e.g., 0.5) into one group. For example, as illustrated in FIG. 15, the final clustering module 343 may cluster the first to third nodes N1-N3 connected by edges including the reliability score greater than or equal to the threshold value into a first group G1, and cluster the fourth to seventh nodes N4-N7 connected by edges including the reliability score greater than or equal to the threshold value into a second group G2.

The final clustering module 343 may cluster the plurality of devices into a plurality of groups by using a community detection algorithm. Here, the community detection algorithm is an algorithm that outputs identification information regarding groups to which each of the plurality of devices belongs. The final clustering module 343 may obtain identification information regarding the groups to which each of the plurality of devices belongs by applying the fifth graph to the community detection algorithm. The final clustering module 343 may define devices of which identification information regarding the groups is identical as the same group. The final clustering module 343 may match the identification information of each of the plurality of devices and the identification information of the groups to which each of the plurality of devices belongs, and store the information in the memory 120.

Figure 16:
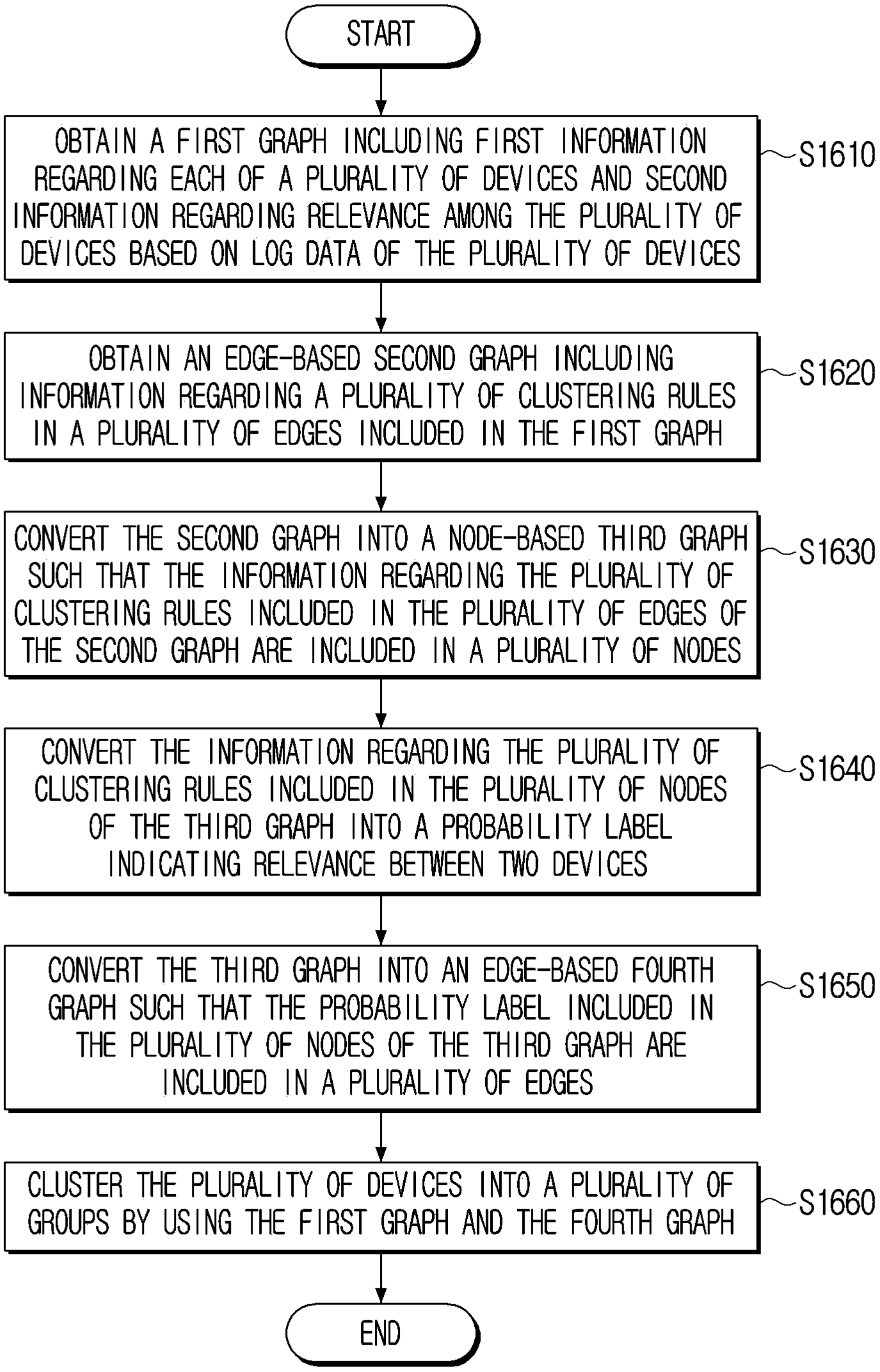
FIG. 16 is a flow chart for illustrating a control method for an electronic apparatus for clustering a plurality of devices according to an embodiment of the disclosure.

FIG. 16 is a flow chart for illustrating a control method for an electronic apparatus for clustering a plurality of devices according to an embodiment of the disclosure.

First, the electronic apparatus 100 obtains a first graph including first information regarding each of a plurality of devices and second information regarding relevance among the plurality of devices based on log data of the plurality of devices in operation S1610. The electronic apparatus 100 may obtain an initial graph including a plurality of nodes and edges among the plurality of nodes based on the log data. Then, the electronic apparatus 100 may obtain the first information based on the information regarding the plurality of devices, and obtain the second information based on the information regarding the plurality of device pairs. Then, the electronic apparatus 100 may obtain the first graph including the first information (or the first feature vector) in the plurality of nodes included in the initial graph, and the second information (or the second feature vector) in the edges among the plurality of nodes included in the initial graph.

The electronic apparatus 100 obtains an edge-based second graph including information regarding a plurality of clustering rules in a plurality of edges included in the first graph in operation S1620. Here, each of the plurality of clustering rules may be a rule for determining relevance between two devices. The information regarding the clustering rules may include a first label if it is determined that relevance exists between the two devices, and include a second label if it is determined that relevance does not exist between the two devices, and include a third label if relevance between the two devices is not determined. The information regarding the plurality of clustering rules may include a label set including at least two of the first or third label.

The electronic apparatus 100 converts the second graph into a node-based third graph such that the information regarding the plurality of clustering rules included in the plurality of edges of the second graph are included in a plurality of nodes in operation S1630. Here, in case the plurality of edges included in the second graph are edges having directivity, the electronic apparatus 100 may, regarding the plurality of nodes included in the third graph, convert the second graph into the third graph such that only nodes corresponding to edges toward the same node among the plurality of edges included in the second graph are connected with each other by the edges. Also, the electronic apparatus 100 may delete edges of which Jaccard index is smaller than or equal to a predetermined value among the plurality of edges included in the third graph. Further, in case a node including the third label in a label set exists among the plurality of nodes included in the third graph, the electronic apparatus 100 may convert the node including the third label into a node including the first or second label in the label set by using at least one node connected with the node including the third label.

The electronic apparatus 100 converts the information regarding the plurality of clustering rules included in the plurality of nodes of the third graph into a probability label indicating relevance between two devices in operation S1640. The electronic apparatus 100 may obtain a probability label indicating relevance between devices based on the information regarding the plurality of clustering rules included in the plurality of nodes through weak supervised learning, and convert the information regarding the plurality of clustering rules included in the plurality of nodes of the third graph into a probability label indicating relevance between devices.

The electronic apparatus 100 converts the third graph into an edge-based fourth graph such that the probability label included in the plurality of nodes of the third graph is included in a plurality of edges in operation S1630.

The electronic apparatus 100 clusters the plurality of devices into a plurality of groups by using the first graph and the fourth graph in operation S1660. The electronic apparatus 100 may obtain a reliability score predicting a relation between two devices based on the second information included in the first graph and the probability label included in the fourth graph, and cluster the plurality of devices into a plurality of groups based on the obtained reliability score. Also, the electronic apparatus 100 may cluster the plurality of devices into a plurality of groups by using the community detection algorithm.

The method according to an embodiment of the disclosure as described above may be used in integrating knowledge graphs. When integrating knowledge graphs, it is an important matter to find similar nodes among the graphs. According to an embodiment of the disclosure, when integrating knowledge graphs, the electronic apparatus 100 may generate edges regarding connections having similarity among nodes among the plurality of knowledge graphs. The electronic apparatus 100 may construct a label set according to clustering rules that seek similarity between two nodes in each edge. Here, not all of the plurality of clustering rules may be applied to all edges. The electronic apparatus 100 may make the first or second label included in an edge to which a label set is not applied by using the GNN. The electronic apparatus 100 may convert label sets included in the plurality of edges into probability labels by using weak supervised learning. The electronic apparatus 100 may identify similarity among the nodes of the plurality of graphs through the probability labels.

In the aforementioned embodiment, it was explained that the plurality of devices are clustered, but this is merely an example, and according to the technical idea of the disclosure, graph data including nodes and edges may be clustered. For example, the electronic apparatus 100 can obviously cluster various types of graph data such as users, contents, etc. other than devices.

Functions related to artificial intelligence according to the disclosure are operated through the processor and the memory of the electronic apparatus 100.

The processor may consist of one or a plurality of processors. Here, the one or plurality of processors may include at least one of a central processing unit (CPU), a graphic processing unit (GPU), or a neural processing unit (NPU), but are not limited to the aforementioned examples of the processors.

A CPU is a generic-purpose processor that can perform not only general operations but also artificial intelligence operations, and it can effectively execute a complex program through a multilayer cache structure. A CPU is advantageous for a serial processing method that enables a systemic linking between the previous calculation result and the next calculation result through sequential calculations. A generic-purpose processor is not limited to the aforementioned examples excluding cases wherein it is specified as the aforementioned CPU.

A GPU is a processor for mass operations such as a floating point operation used for graphic processing, etc., and it can perform mass operations in parallel by massively integrating cores. A GPU may be advantageous for a parallel processing method such as a convolution operation, etc. compared to a CPU. Also, a GPU may be used as a co-processor for supplementing the function of a CPU. A processor for mass operations is not limited to the aforementioned examples excluding cases wherein it is specified as the aforementioned GPU.

An NPU is a processor specialized for an artificial intelligence operation using an artificial neural network, and it can implement each layer constituting an artificial neural network as hardware (e.g., silicon). Here, the NPU is designed to be specialized according to the required specification of a company, and thus it has a lower degree of freedom compared to a CPU or a GPU, but it can effectively process an artificial intelligence operation required by the company. As a processor specialized for an artificial intelligence operation, an NPU may be implemented in various forms such as a tensor processing unit (TPU), an intelligence processing unit (IPU), a vision processing unit (VPU), etc. An artificial intelligence processor is not limited to the aforementioned examples excluding cases wherein it is specified as the aforementioned NPU.

Also, the one or plurality of processors may be implemented as a system on chip (SoC). Here, in the SoC, the memory, and a network interface such as a bus for data communication between the processor and the memory, etc. may be further included other than the one or plurality of processors.

In case a plurality of processors are included in the system on chip (SoC) included in the electronic apparatus, the electronic apparatus may perform an operation related to artificial intelligence (e.g., an operation related to learning or inference of the artificial intelligence model) by using some processors among the plurality of processors. For example, the electronic apparatus may perform an operation related to artificial intelligence by using at least one of a GPU, an NPU, a VPU, a TPU, or a hardware accelerator specified for artificial intelligence operations such as a convolution operation, a matrix product operation, etc. among the plurality of processors. However, this is merely an example, and the electronic apparatus can obviously process an operation related to artificial intelligence by using the generic-purpose processor such as a CPU, etc.

Also, the electronic apparatus may perform operations related to artificial intelligence by using a multicore (e.g., a dual core, a quad core, etc.) included in one processor. The electronic apparatus may perform artificial intelligence operations such as a convolution operation, a matrix product operation, etc. in parallel by using the multicore included in the processor.

The one or plurality of processors perform control to process input data according to predefined operation rules or an artificial intelligence model stored in the memory. The predefined operation rules or the artificial intelligence model are characterized in that they are made through learning.

Here, being made through learning means that a learning algorithm is applied to a plurality of training data, and predefined operation rules or an artificial intelligence model having desired characteristics are thereby made. Such learning may be performed in an apparatus itself wherein artificial intelligence is performed according to the disclosure, or performed through a separate server/system.

An artificial intelligence model may consist of a plurality of neural network layers. At least one layer has at least one weight value, and performs an operation of the layer through the operation result of the previous layer and at least one defined operation. As examples of a neural network, there are a convolutional neural network (CNN), a deep neural network (DNN), a recurrent neural network (RNN), a restricted Boltzmann Machine (RBM), a deep belief network (DBN), a bidirectional recurrent deep neural network (BRDNN), deep Q-networks, and a Transformer, but the neural network in the disclosure is not limited to the aforementioned examples excluding specified cases.

A learning algorithm is a method of training a subject device (e.g., a robot) by using a plurality of training data and thereby making the subject device make a decision or make prediction by itself. As examples of learning algorithms, there are supervised learning, unsupervised learning, semi-supervised learning, or reinforcement learning, but learning algorithms in the disclosure are not limited to the aforementioned examples excluding specified cases.

The method according to the various embodiments of the disclosure may be provided while being included in a computer program product. A computer program product refers to a product, and it can be traded between a seller and a buyer. A computer program product can be distributed in the form of a storage medium that is readable by machines (e.g.: compact disc read only memory (CD-ROM)), or may be distributed directly between two user devices (e.g.: smartphones), and distributed on-line (e.g.: download or upload) through an application store (e.g.: Play Store™). In the case of on-line distribution, at least a portion of a computer program product (e.g.: a downloadable app) may be stored in a storage medium such as the server of the manufacturer, the server of the application store, and the memory of the relay server at least temporarily, or may be generated temporarily.

Also, the method according to the various embodiments of the disclosure may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments (e.g.: a TV).

A storage medium readable by machines may be provided in the form of a non-transitory storage medium. Here, the term 'a non-transitory storage medium' only means that a storage medium is a tangible device, and does not include signals (e.g.: electromagnetic waves), and the term does not distinguish a case wherein data is stored in the storage medium semi-permanently and a case wherein data is stored temporarily. For example, 'a non-transitory storage medium' may include a buffer wherein data is temporarily stored.

In case an instruction is executed by a processor, the processor may perform a function corresponding to the instruction by itself, or by using other components under its control. An instruction may include a code that is generated or executed by a compiler or an interpreter.

Also, while embodiments of the disclosure have been shown and described, the disclosure is not limited to the aforementioned embodiments, and it is apparent that various modifications may be made by those having ordinary skill in the technical field to which the disclosure belongs, without departing from the spirit of the disclosure as claimed by the appended claims. Further, it is intended that such modifications are not to be interpreted independently from the technical idea or prospect of the disclosure.

What is claimed is:

1. A control method for an electronic apparatus, comprising:

obtaining, based on log data of a plurality of devices, a first graph comprising first information regarding the plurality of devices and second information regarding relevance among the plurality of devices, wherein the plurality of devices include a first device and a second device;

obtaining an edge-based second graph based on the first graph such that a second plurality of edges of the edge-based second graph comprise a first plurality of edges of the first graph, and the second plurality of edges comprise third information regarding a plurality of clustering rules from the first plurality of edges of the first graph;

converting the edge-based second graph into a node-based third graph such that a third plurality of nodes of the third graph comprise the third information;

converting the third information from the third plurality of nodes into a plurality of probability labels of the third plurality of nodes, wherein each probability label of the plurality of probability labels indicates relevance between two devices from among the plurality of devices, and the converting the third information from the third plurality of nodes into the plurality of probability labels comprises:

converting a third label in a first node in the third plurality of nodes to a first label or a second label by inputting information regarding at least one node connected to the first node into a trained graph neural network model, wherein the third label indicates relevance between the two devices is not determined, the first label indicates relevance exists between the two devices, and the second label indicates relevance does not exist between the two devices; and obtaining the plurality of probability labels based on the third information through weak supervised learning by using the plurality of clustering rules;

converting the node-based third graph into an edge-based fourth graph such that a fourth plurality of edges of the edge-based fourth graph comprise the plurality of probability labels from the third plurality of nodes;

clustering the plurality of devices into a plurality of groups based on the first graph and the edge-based fourth graph; and if it is determined that the first device and the second device belong to a same group in the plurality of groups, providing one or more contents to the first device and the second device, so that the first device and the second device have interrelated contents, wherein the one or more contents contain one or more movies or one or more advertisements.

2. The control method of claim 1, wherein the obtaining the first graph comprises:

obtaining, based on the log data, an initial graph comprising an initial plurality of nodes and an initial plurality of edges among the initial plurality of nodes;

obtaining the first information based on fourth information regarding the plurality of devices, and obtaining the second information based on fifth information regarding a plurality of pairs of the plurality of devices; and obtaining the first graph based on the initial graph such that:

a first plurality of nodes of the first graph comprise the initial plurality of nodes, and the first plurality of nodes further comprise the first information, and the first plurality of edges comprise the initial plurality of edges, and the first plurality of edges further comprise the second information.

3. The control method of claim 1, wherein the plurality of clustering rules determine relevance between the two devices from among the plurality of devices, wherein the third information comprises:

the first label based on determining relevance exists between the two devices, the second label based on determining relevance does not exist between the two devices, and the third label based on relevance between the two devices not being determined, and wherein the third information comprises a first label set comprising at least two labels from among the first label and the third label.

4. The control method of claim 3, wherein the control method further comprises:

based on a second node from among the third plurality of nodes in the third graph comprising a second label set that includes only the third label, converting the second node into a third node comprising one from among the first label and the second label based on at least one node connected with the second node.

5. The control method of claim 1, wherein the converting the edge-based second graph into the node-based third graph comprises, based on the second plurality of edges having directivity:

converting the edge-based second graph into the node-based third graph such that only nodes corresponding to edges toward a same node among the second plurality of edges are connected with each other by the edges.

6. The control method of claim 5, wherein the converting the edge-based second graph into the node-based third graph comprises:

deleting an edge from among a third plurality of edges based on a Jaccard index of the edge being less than or equal to a predetermined value.

7. The control method of claim 3, wherein the converting the third information into the plurality of probability labels comprises:

obtaining the plurality of probability labels based on the third information through weak supervised learning; and converting the third information into the plurality of probability labels.

8. The control method of claim 7, wherein the clustering the plurality of devices into the plurality of groups comprises:

obtaining a plurality of reliability scores, wherein a reliability score predicts a level of relation between two devices based on the second information of the first graph and a corresponding probability label of the edge-based fourth graph; and clustering the plurality of devices into the plurality of groups based on the plurality of reliability scores.

9. The control method of claim 1, wherein the clustering the plurality of devices into the plurality of groups comprises:

clustering the plurality of devices into the plurality of groups based on a community detection algorithm.

10. An electronic apparatus comprising:

one or more processors; and memory storing instructions that, when executed by the one or more processors, cause the electronic apparatus to:

obtain, based on log data of a plurality of devices, a first graph comprising first information regarding the plurality of devices and second information regarding relevance among the plurality of devices, wherein the plurality of devices include a first device and a second device;

obtain an edge-based second graph based on the first graph such that a second plurality of edges of the edge-based second graph comprise a first plurality of edges of the first graph, and the second plurality of edges comprise third information regarding a plurality of clustering rules from the first plurality of edges of the first graph;

convert the edge-based second graph into a node-based third graph such that a third plurality of nodes of the third graph comprise the third information;

convert the third information from the third plurality of nodes into a plurality of probability labels of the third plurality of nodes, wherein each probability label of the plurality of probability labels indicates relevance between two devices from among the plurality of devices, and the converting the third information from the third plurality of nodes into the plurality of probability labels comprises:

converting a third label in a first node in the third plurality of nodes to a first label or a second label by inputting information regarding at least one node connected to the first node into a trained graph neural network model, wherein the third label indicates relevance between the two devices is not determined, the first label indicates relevance exists between the two devices, and the second label indicates relevance does not exist between the two devices; and obtaining the plurality of probability labels based on the third information through weak supervised learning by using the plurality of clustering rules;

convert the node-based third graph into an edge-based fourth graph such that a fourth plurality of edges of the edge-based fourth graph comprise the plurality of probability labels from the third plurality of nodes;

cluster the plurality of devices into a plurality of groups based on the first graph and the edge-based fourth graph; and if it is determined that the first device and the second device belong to the same group in the plurality of groups, providing one or more contents to the first device and the second device, so that the first device and the second device have interrelated contents, wherein the one or more contents contain one or more movies or one or more advertisements.

11. The electronic apparatus of claim 10, wherein the one or more processors are configured to execute the instructions to cause the electronic apparatus to:

obtain, based on the log data, an initial graph comprising an initial plurality of nodes and an initial plurality of edges among the initial plurality of nodes;

obtain the first information based on fourth information regarding the plurality of devices, and obtain the second information based on fifth information regarding a plurality of pairs of the plurality of devices; and obtain the first graph based on the initial graph such that:

a first plurality of nodes of the first graph comprise the initial plurality of nodes of the initial graph, and the first plurality of nodes further comprise the first information, and the first plurality of edges comprise the initial plurality of edges, and the first plurality of edges further comprise the second information.

12. The electronic apparatus of claim 10, wherein the plurality of clustering rules determine relevance between the two devices from among the plurality of devices, wherein the third information comprises:

the first label based on determining relevance exists between the two devices, the second label based on determining relevance does not exist between the two devices, and the third label based on relevance between the two devices not being determined, and wherein the third information comprises a first label set comprising at least two labels from among the first label and the third label.

13. The electronic apparatus of claim 12, wherein the one or more processors are further configured to execute the instructions to cause the electronic apparatus to:

based on a second node from among the third plurality of nodes in the third graph comprising a second label set that includes only the third label, convert the second node into a third node comprising one from among the first label and the second label based on at least one node connected with the second node.

14. The electronic apparatus of claim 10, wherein the one or more processors are configured to execute the instructions to cause the electronic apparatus to, based on the second plurality of edges having directivity:

convert the edge-based second graph into the node-based third graph such that only nodes corresponding to edges toward a same node among the second plurality of edges are connected with each other by the edges.

15. The electronic apparatus of claim 14, wherein the one or more processors are configured to execute the instructions to cause the electronic apparatus to:

delete an edge from among a third plurality of edges of the node-based third graph based on a Jaccard index of the edge being less than or equal to a predetermined value.

* * * * *